Patented Sept. 29, 1931

1,825,603

UNITED STATES PATENT OFFICE

CARL RACH, OF NEW YORK, N. Y.

METHOD OF MAKING DEXTROSE AND DEXTROSE COMPOUNDS

No Drawing.   Application filed March 17, 1930.   Serial No. 436,637.

My invention relates to food products, and particularly food products comprising chemical compounds which are used as condiments or for seasoning. The invention is especially useful in providing a pure sweetening product at low cost.

The sweetening products now in use are, in the order of their importance, saccharose, dextrose, maltose and levulose. The first named has the formula $C_{12}H_{22}O_{11}$, and is produced from cane or beet sugar. Dextrose has the formula $C_6H_{12}O_6$, and is contained in grape juice and in the impure forms known as glucose or glykose. It is not necessary to consider maltose and levulose here.

The reason for the extensive use of saccharose is the facility and economy with which it may be produced. This results from the ease with which saccharose crystallizes from the juices of the sugar cane or the sugar beet.

Dextrose has been produced commercially, but its manufacture is complicated, tedious and costly. The price of dextrose, compares most unfavorably with that of saccharose because of the difficulties encountered in its manufacture. The difficulty of producing dextrose is largely the result of the extreme slightness of its tendency to crystallize when contained in impure solution. For this reason dextrose is usually sold as glucose in the form of syrup, corn sugar, starch sugar, potato sugar, etc., where it is found mixed with other substances and in impure state. Only in this form can dextrose be sold at an attractive price, and the degree of its sweetness is far below that of saccharose.

I have found that a pure food product, comprising a crystallized compound containing dextrose or crystallized dextrose alone, may be easily produced at a cost permittting direct competition with saccharose. To this end, I determine the amount of dextrose in an impure solution containing glucose. I then add a compound adapted to combine with the dextrose in the impure solution to form crystals containing dextrose, evaporate the solution to syrup consistency in order to effect crystallization of the dextrose and the compound, collect the crystals so formed and dry them. The resulting crystals are a pure product in which dextrose is present.

For instance, I may add sodium chloride (ordinary cooking salt) to an impure solution containing dextrose, and evaporate the solution to syrup consistency. Crystallization of dextrose sodium chloride results, and these crystals may be collected and dried. The product is pure dextrose sodium chloride which has the formula $$(2C_6H_{12}O_6).NaCl.H_2O.$$

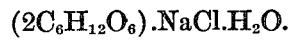

This product has a sweetness which exceeds that of the impure glucose now commercially produced, combined with a saline taste resulting from the presence of sodium chloride in the crystal. Thus by using the affinity which sodium chloride has for dextrose, I separate pure dextrose out of a solution in which it is contained. Such solutions may be grape sugar solutions, a hydrolyzed starch solution, a solution of commercial corn sugar, etc.

The following are examples of how my invention may be carried out:

Example 1

The juice of sweet, ripe grapes is boiled to coagulate the albumin which it contains. The liquid is then filtered through a bag filter. Next a chemical analysis is made to determine the amount of dextrose ($C_6H_{12}O_6$), which is present. A concentrated aqueous solution of sodium chloride is now made, and this solution is added to the grape juice in the ratio of sixteen parts by weight of sodium chloride to eighty-four parts by weight of dextrose found in the grape juice. The dextrose combines at once with the sodium chloride to form dextrose sodium chloride in liquid form. The combined solution is now evaporated, preferably in a vacuum pan, to syrup consistency. The syrup is collected in flat crystallization pans, where crystallization of the dextrose sodium chloride takes place quickly and without difficulty. When the magma becomes sufficiently thick, it is put in bag filters, and the mother liquor is drained off, leaving the pure dextrose sodium chloride crystals in the bag filters. The crystals may now be washed with a pure concentrated dextrose solution. The crystals are now compressed between cloths and dried at a medium high temperature.

The resulting crystals appear perfectly white and contain dextrose in pure form. They have a sweetish slightly saline taste.

*Example 2*

To a boiling solution of one part by weight of chemically pure concentrated hydrochloric acid in twenty parts by weight of pure water, there is added gradually ten parts by weight of starch. This starch may be corn starch, potato starch, wheat starch, rice starch, etc. Boiling is continued until the starch is hydrolyzed and converted into glucose, as indicated by the well-known iodine and alcohol test. The acid content of the solution is now determined quantitatively and the acid is neutralized with an equivalent quantity of sodium carbonate. Next, all solid matter in suspension and all coloring matter is eliminated by filtration over animal charcoal. An aliquot part of the liquid is now removed and the amount of dextrose therein is determined. A concentrated solution of sodium chloride is added to the main solution, the amount of sodium chloride bearing the proportion of sixteen parts free from water of crystallization to eighty-four parts of dextrose in the solution. The combined liquids are evaporated in a vacuum pan to syrup consistency and the dextrose sodium chloride is crystallized and separated out as described in Example 1. The product is exactly the same as that obtained in Example 1.

As has already been indicated dextrose sodium chloride contains pure dextrose and has a very agreeable sweetish saline taste. It proves exceedingly useful wherever sugar and salt would both be used, for instance in making cake.

Dextrose can be obtained from dextrose sodium chloride with surprising ease. It is merely necessary to dissolve the crystals of dextrose sodium chloride under proper conditions and to re-crystallize only the dextrose. I have found the following to be an effective method of obtaining dextrose from dextrose sodium chloride crystals.

In a copper kettle equipped with an effective stirring apparatus, a quantity of dry, finely powdered dextrose sodium chloride is placed, to this compound is quickly added cold water in a proportion of one part of cold water to two parts of dextrose sodium chloride by weight. The mixture is stirred briskly and liquefies at first. In a very short time, however, a stiff magma is produced. This is put in shallow pans on press cloth. The solid matter is now removed from the shallow pans and is submitted in a press to strong pressure. The resulting press cakes are removed from the press, dried at a temperature below 100° F., and ground to a powder. This powder is pure dextrose. It has a snowy white color and a crystalline structure and dissolves readily upon the tongue, giving a sweet pleasant taste.

Of course the process covered by the invention is not limited to the specific examples given. Other examples besides these here given by way of illustration are known, and still others which do not depart from the proper scope of this invention may suggest themselves to one skilled in the art.

I claim:

1. A process for manufacturing pure dextrose sodium chloride comprising determining the amount of dextrose in an impure solution containing dextrose, adding sodium chloride to the solution, evaporating the solution to syrup consistency to effect crystallization of dextrose sodium chloride, and collecting the crystals.

2. A process for manufacturing pure dextrose sodium chloride comprising determining the amount of dextrose in an impure solution containing dextrose, adding a concentrated aqueous solution of sodium chloride to the solution, evaporating the resulting solution to syrup consistency, spreading the solution in a thin layer to promote crystallization of the dextrose sodium chloride, filtering off the liquid from the crystals there formed, and pressing and drying the crystals.

3. A process for manufacturing pure dextrose sodium chloride comprising determining the amount of dextrose in an impure solution containing dextrose, adding to the impure solution a concentrated aqueous solution of sodium chloride in the approximate proportion of sixteen parts of sodium chloride to eighty-four parts of pure dextrose, evaporating the resulting solution to syrup consistency to effect crystallization of dextrose sodium chloride, collecting the crystals, and pressing and drying them.

4. A process for manufacturing pure dextrose comprising determining the amount of dextrose in an impure solution containing dextrose, adding sodium chloride to combine with dextrose to form crystals, evaporating the solution to syrup consistency to effect crystallization of the dextrose sodium chloride, collecting the crystals in the approximate proportion of one part of water and two parts of crystals, adding cold water to the crystals, stirring, and collecting the resulting crystals.

5. A process for manufacturing pure dextrose comprising determining the amount of dextrose in an impure solution containing dextrose, adding sodium chloride to the solution, evaporating the solution to syrup consistency to effect crystallization of dextrose sodium chloride, collecting the crystals, pressing and drying the crystals adding cold water, in the approximate proportion of one part of water and two parts of crystals, stirring, and pressing out the resulting crystals with a press cloth.

6. A process for manufacturing pure dextrose comprising determining the amount of dextrose in an impure solution containing dextrose, adding to the impure solution a concentrated aqueous solution of sodium chloride in the proportion of sixteen parts of sodium chloride to eighty-four parts of pure dextrose, evaporating the resulting solution to syrup consistency to effect crystallization of dextrose sodium chloride, collecting the crystals, adding cold water in the approximate proportion of one part of cold water to two parts of crystals, stirring the solution, and collecting the resulting crystals, substantially as described.

In testimony whereof I have signed my name to this specification.

CARL RACH.